US009469215B2

(12) United States Patent
Mason et al.

(10) Patent No.: US 9,469,215 B2
(45) Date of Patent: Oct. 18, 2016

(54) APPARATUS FOR MOUNTING TO A VEHICLE

(71) Applicant: Jaguar Land Rover Limited, Whitley Coventry, Warwickshire (GB)

(72) Inventors: Belinda Mason, Stratford Upon Avon (GB); Mark Truman, Birmingham (GB); Thomas Scola, Sapcote (GB); Robert Egan, Leamington Spa (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/576,210

(22) Filed: Dec. 19, 2014

(65) Prior Publication Data

US 2015/0175033 A1 Jun. 25, 2015

(30) Foreign Application Priority Data

Dec. 20, 2013 (GB) .................................. 1322643.6

(51) Int. Cl.

| | |
|---|---|
| ***B60N 2/00*** | (2006.01) |
| ***B60N 2/015*** | (2006.01) |
| ***B60N 2/30*** | (2006.01) |
| ***B60R 5/04*** | (2006.01) |
| ***B60N 3/06*** | (2006.01) |

(52) U.S. Cl.

CPC ......... *B60N 2/01508* (2013.01); *B60N 2/3095* (2013.01); *B60N 3/063* (2013.01); *B60R 5/04* (2013.01)

(58) Field of Classification Search

CPC B60N 2/01508; B60N 2/3095; B60N 3/063; B60R 5/04

See application file for complete search history.

(56) References Cited

U.S. PATENT DOCUMENTS

| | | | | |
|---|---|---|---|---|
| 5,971,464 A | 10/1999 | Davis et al. | | |
| 6,116,676 A * | 9/2000 | Edwards | B60N 2/3011 | 296/64 |
| 6,631,938 B1 * | 10/2003 | Burns | B60P 3/36 | 296/64 |
| 6,779,824 B1 | 8/2004 | Lazarevich et al. | | |
| 7,080,870 B1 | 7/2006 | McCann et al. | | |
| 7,290,821 B1 | 11/2007 | McCann et al. | | |
| 8,376,443 B2 * | 2/2013 | Kemp | B60N 2/3013 | 296/64 |
| 8,567,846 B1 * | 10/2013 | Stevens | B60N 2/36 | 296/64 |
| 2004/0084927 A1 | 5/2004 | Brown | | |
| 2006/0076794 A1 * | 4/2006 | Bauer | B60P 1/435 | 296/37.6 |
| 2008/0246298 A1 * | 10/2008 | Leigh-Monstevens | B60N 2/015 | 296/64 |
| 2010/0096876 A1 * | 4/2010 | Fletcher | B60N 2/01 | 296/64 |
| 2012/0146355 A1 | 6/2012 | Dinger et al. | | |

FOREIGN PATENT DOCUMENTS

WO WO 2005014330 A2 * 2/2005 ........... B60N 2/3011

OTHER PUBLICATIONS

GB Combined Search and Examination Report for corresponding application No. GB1322643.6, dated Aug. 6, 2014, 7 pages.

* cited by examiner

*Primary Examiner* — Lori L Lyjak

(74) *Attorney, Agent, or Firm* — Reising Ethington P.C.

(57) ABSTRACT

An apparatus for mounting in a door aperture of a vehicle. The apparatus includes a mounting element for mounting the apparatus in the door aperture. The mounting element is adapted to cooperate with a fixing disposed on the vehicle. The apparatus can include one or more seats for use when the vehicle is stationary. A method of mounting the apparatus to a vehicle is also provided.

19 Claims, 9 Drawing Sheets

APPARATUS FOR MOUNTING TO A VEHICLE

TECHNICAL FIELD

The present invention relates to apparatus for mounting in a vehicle door aperture; a temporary or social seat for mounting to a vehicle; an accessory for a vehicle; and a method of mounting apparatus to a vehicle.

BACKGROUND

It is known to provide an off-road vehicle with a split tailgate comprising an upper tailgate and a lower tailgate. The lower tailgate can be opened to a horizontal position to provide a platform extending outwardly at the rear of the vehicle. It is not uncommon for individuals to use the resulting platform as an impromptu seat. However, this can prove uncomfortable even for relatively short periods of time as this is not the intended function of the lower tailgate. Moreover, the tailgate may be dirty and this could potentially be transferred onto the clothes of the individual using it as a seat.

At least in certain embodiments, the present invention sets out to overcome or ameliorate at least some of the shortcomings outlined above.

SUMMARY

According to a first aspect of the present invention, there is provided an apparatus for mounting in a door aperture of a vehicle, the apparatus comprising: a mounting apparatus for removably mounting the apparatus in the door aperture, wherein said mounting apparatus is adapted to cooperate with a fixing device disposed on said vehicle; and a support frame comprising a first transverse member for positioning transversely across the door aperture, the mounting apparatus being provided on said first transverse member.

The mounting apparatus may comprise a first connector and a second connector. The first and second connectors may each comprise a striker element.

The apparatus may be adapted to cooperate with a fixing device in the form of at least one latch fixedly mounted to said vehicle. The at least one latch may be configured to secure a door closure element associated with said door aperture. The door closure element may be a tailgate or a split tailgate element and said at least one latch may be configured to secure said tailgate or said split tailgate element in a closed position.

The support frame may comprise a second transverse member for positioning transversely across the door aperture. The second transverse member may comprise at least one locating member for positioning against the vehicle. The second transverse member may extend across a portion or substantially all of the width of the door aperture. The second transverse member may comprise two locating members disposed at respective ends thereof for positioning against the vehicle at respective locations on opposite sides of the door aperture.

The at least one locating member may be suitable for locating within a drainage channel formed adjacent to said door aperture.

The support frame may comprise one or more locating feet for engaging a body structure of the vehicle. The support frame may have an adjustable width.

The apparatus may comprise one or more seats. Each seat may comprise a base and a back support. The base may be configured to be supported by the vehicle; and the back support may be configured to be supported by said support frame. The base of each seat may be coupled to the support frame to inhibit relative movement. Each seat may comprise a reinforcing member disposed at a front edge of the base.

The apparatus may comprise an occupant foot support associated with each said seat.

The apparatus may comprise a carrier rack.

According to another aspect of the present invention, there is a provided a vehicle in combination with the apparatus as described herein.

According to another aspect of the present invention there is provided an accessory for mounting in a door aperture of a vehicle, the accessory comprising a mounting apparatus for mounting the accessory in the door aperture; wherein said mounting apparatus is adapted to cooperate with a fixing device disposed on said vehicle.

According to another aspect of the present invention there is provided a method of mounting apparatus in a door aperture of a vehicle, the apparatus comprising a support frame having a mounting apparatus adapted to cooperate with a fixing device disposed on said vehicle for securing a door closure element associated with said door aperture; the method comprising connecting said mounting apparatus to the fixing device when the door closure element is open.

Aspects of the present invention relate to apparatus for mounting in a vehicle door aperture; a temporary or social seat for mounting to a vehicle; an accessory for a vehicle; and a method of mounting apparatus to a vehicle.

According to a further aspect of the present invention there is provided an apparatus for mounting in a door aperture of a vehicle, the apparatus comprising mounting means for removably mounting the apparatus in the door aperture; wherein said mounting means is adapted to cooperate with fixing means disposed on said vehicle. The apparatus can be suitable for mounting in the door aperture when the door closure element associated with that door aperture is in an open position. The apparatus can be temporarily mounted to the vehicle. However, by coupling the mounting means to said fixing means on the vehicle, the apparatus can be securely mounted. The apparatus can thereby provide a secure base or support for mounting additional components to the vehicle.

The mounting means can comprise a first connector and a second connector. The first and second connectors could comprise latches or the like. Alternatively, the first and second connectors can each comprise a striker element for cooperating with a latch mechanism. The striker element can comprise a hoop (for example a U-shaped bolt). Alternatively, the striker element can comprise a striker pin. The striker pin can permit at least a limited amount of rotational movement of the support frame. This rotational movement can permit adjustment of the position of the apparatus relative to the vehicle.

The mounting means can be adapted to cooperate with said fixing means. The fixing means can, for example, comprise at least one latch fixedly mounted to said vehicle. The at least one latch can be configured to secure a door closure element associated with said door aperture. Thus, the at least one latch can provide a dual function, namely securing the door closure element or mounting the support frame. The support frame can be configured to mount within the door aperture associated with a load bay of said vehicle.

The door closure element could be a conventional door disposed at the side of the vehicle for occupant ingress/egress through said door aperture. Alternatively, the door aperture can be a trunk (boot) or a load bay aperture. For example, the door aperture could be a load bay aperture provided at the back of a flat bed or pick-up truck. Alternatively, the door aperture can be a tailgate aperture provided at the rear of the vehicle. A tailgate can be associated with the tailgate aperture. The tailgate can be hinged to the vehicle about a horizontal axis or a vertical axis. The tailgate can be a split tailgate, for example comprising an upper tailgate and a lower tailgate. The at least one latch can be configured to secure said tailgate or a portion of said split tailgate in a closed position. For example, the at least one latch can be configured to secure a lower portion of the split tailgate in a closed position. The fixing means can comprise left and right latches disposed on respective sides of the vehicle for securing the tailgate (or split tailgate portion) closed.

The apparatus can comprise a support frame. The mounting means can be provided on said support frame. The first connector can be provided at a first end of the support frame and the second connector can be provided at a second end of the support frame.

The support frame can include a first transverse member for positioning transversely across the door aperture. The mounting means can be provided on said first transverse member. The support frame can include a second transverse member for positioning transversely across the door aperture. The second transverse member can include locating means for positioning against the vehicle. The locating means can include at least one extension member for locating within a drainage channel disposed adjacent to said door aperture. For example, one said extension member can be provided on each side of the second transverse member for locating in a corresponding drainage channel. The extension member(s) can be configured to prevent the apparatus from fouling aperture seals, which might otherwise lead to water ingress issues in normal usage if the aperture seals are subjected to repeated localised compression. Alternatively, an extension member can be provided on each side of the second transverse member for positioning against the vehicle body work.

The support frame can include one or more locating feet for locating on a body structure of the vehicle. The vertical offset between said one or more locating feet and the mounting means can be configured to enable the support frame to be pivoted relative to the body structure to locate the mounting means in said fixing means. In use, the one or more locating feet can engage the vehicle body structure and inhibit movement (rotational and/or translational) of the apparatus relative to the vehicle.

The support frame can have an adjustable width. The width of the support frame can be reduced to facilitate storage, for example in the load space of the vehicle. The width of the support frame can be increased when the support frame is to be installed. The support frame can have a telescopic arrangement. The support frame could have an adjustable height at last in certain embodiments.

The apparatus can comprise one or more seats. The one or more seats can be mounted to the support frame. The seats can each comprise a base and a back support. The base and the back support can be pivotable relative to each other. The base and the back support can be pivoted to facilitate storage. The back of the base of each seat can be coupled to the support frame to inhibit relative movement. For example, the base of each seat can comprise a locating aperture through which an upright member of the support frame (or one of said locating feet) extends operatively to locate the base of the seat within the vehicle. Alternatively, a strap or the like could be provided to couple the base of each seat to the support frame.

The base can be configured to be supported by the vehicle. For example, the base can be supported by a lower tailgate. The back support can be configured to be supported by said support frame.

The or each seat can comprise a reinforcing member disposed at a front edge of the base. The reinforcing member can extend transversely across the width of the base. The reinforcing member can be rigid, for example in the form of a metal rod. The base can comprise a convex support member extending between the support frame and the reinforcing member. One or more webbing straps can be provided to connect the reinforcing member to the support frame. The webbing strap(s) can help to maintain the convex shape of the support member in the base of the seat. The convex support member can function as a thigh support for an occupant of the seat. The convex support member can be made of a resilient sheet member, for example made of saddle leather.

The apparatus can comprise a foot support associated with each said seat. The foot support can be used to support the feet of a seat occupant. The foot support can be carried by the reinforcing member. The foot support can comprise a platform supported by adjustable straps.

The apparatus can comprise a carrier rack. The carrier rack can be mounted to or integrated with the support frame. The rack can be for supporting recreational or sporting equipment. For example, the rack can be a gun rack or a fishing rod rack.

The apparatus can comprise one or more of the following accessories: a cooler unit (such as a champagne chiller); a storage unit; a centre console; a side console; an apple catcher, i.e. an element extending transversely across an aperture of a vehicle, such as the tailgate, to prevent egress of objects from the load space, particularly when the vehicle is parked on a slope such that objects might roll or slide out of the aperture; and filming equipment (optionally including a coupling for connecting to an upper part of the vehicle).

According to a further aspect of the present invention, there is provided a vehicle in combination with the apparatus as described herein. The vehicle can be an automobile, for example having a saloon or station wagon (estate) body style. Alternatively, the vehicle can be a sports utility vehicle (SUV) or an off-road vehicle. The vehicle could equally be a truck or utility vehicle.

According to a yet further aspect of the present invention there is provided an accessory for mounting in a door aperture of a vehicle, the accessory comprising a mounting means for mounting the apparatus in the door aperture; wherein said mounting means is adapted to cooperate with fixing means disposed on said vehicle.

According to a still further aspect of the present invention there is provided a method of mounting apparatus in a door aperture of a vehicle, the apparatus comprising a support frame having mounting means adapted to cooperate with fixing means disposed on said vehicle for securing a door closure element associated with said door aperture; the method comprising connecting said mounting means to the fixing means when the door closure element is open.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying figures, in which.

DETAILED DESCRIPTION OF THE ILLUSTRATED EMBODIMENTS

A tailgate seating apparatus 1 in accordance with an embodiment of the present invention will now be described with reference to the accompanying Figures. The apparatus 1 is configured for mounting to a vehicle 3 to provide a recreational or social seat to be used when the vehicle 3 is stationary. In the present embodiment, the apparatus 1 is configured to locate within a tailgate aperture A of the vehicle 3.

The apparatus 1 is described herein with reference to the major axes of the vehicle 3, namely: a longitudinal axis X, a transverse axis Y and a vertical axis Z (shown in FIG. 1) Furthermore, references herein to left and right refer to the corresponding sides of the vehicle 3 when looking from the rear of the vehicle towards the front.

Figure 1:
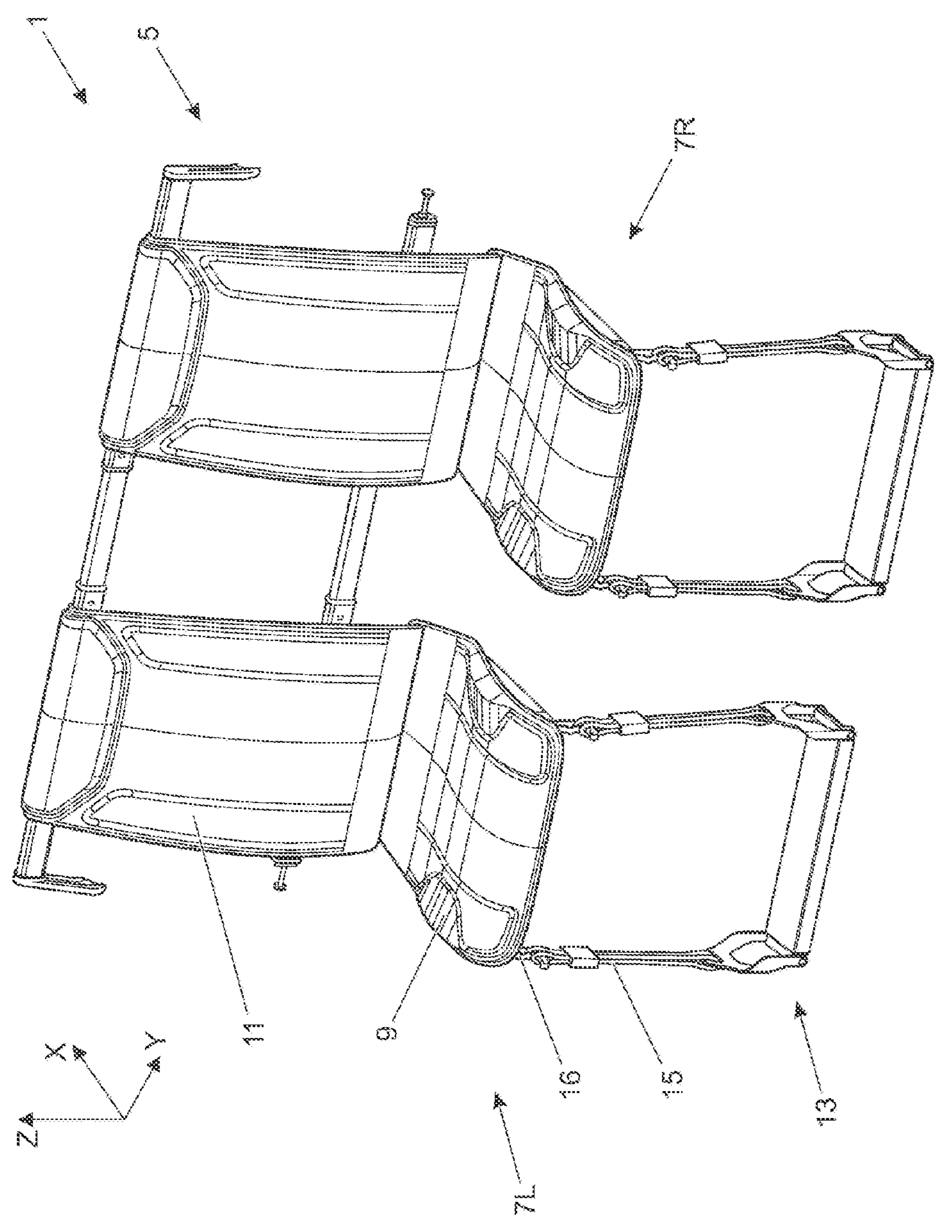
FIG. 1 shows a perspective view of a tailgate seating apparatus in accordance with an embodiment of the present invention.

As shown in FIG. 1, the apparatus 1 comprises a support frame 5 adapted to be releasably mounted to the vehicle 3. The support frame 5 in the present embodiment is made from extruded aluminium sections arranged in a lattice structure, as described herein. The apparatus 1 also comprises left and right seats 7L, 7R mounted to the support frame 5. The left and right seats 7L, 7R both have the same configuration but only the left seat 7L will be described herein for brevity.

The seat 7L comprises a base (cushion) element 9 pivotally mounted to a back (squab) element 11. The base element 9 comprises a resilient base support member (not shown); and the back element 11 comprises a resilient back support member (not shown). The support members define the contours of the associated components of the first seat 7. The base element 9 is attached to the support frame 5 to inhibit longitudinal movement of the seat 7L. The base support member has a convex profile for supporting the user's thighs. A plurality of woven webbing straps extend longitudinally from the front to the back of the base element 9 help to maintain the convex profile of the base support member. In the present embodiment, the back support member and the base support member are made of saddle leather which is trimmed with automotive grade leather. An intermediate layer of foam can optionally be provided between the saddle leather and the automotive grade leather to provide additional cushioning.

A reinforcing element in the form of a rigid rod (not shown) is mounted across a front edge of the base support member to carry a foot support 13. The foot support 13 is supported at each end by an adjustable strap 15 to allow the height of the foot support 13 relative to the base element 9 of the first seat 7 to be adjusted. In the present embodiment, a hook 16 is mounted to each end of the transverse rod for receiving a loop formed in the adjustable straps 15 to support the foot support 13. A resilient facing material can be applied to a back face of each hook 16 to prevent damage to the bodywork of the vehicle 3.

Figure 2:
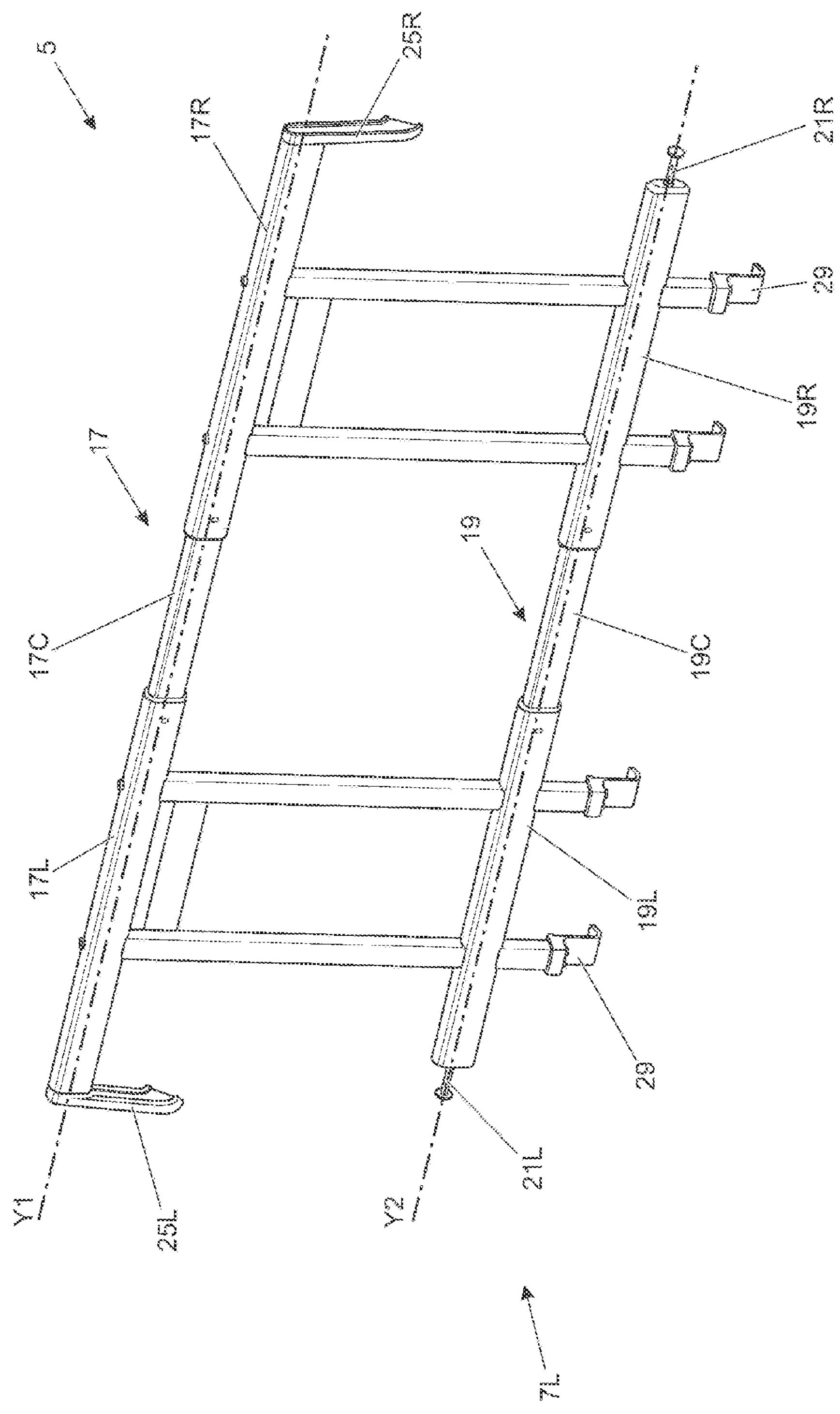
FIG. 2 shows a perspective view of a support frame of the tailgate seating apparatus shown in FIG. 1.

As shown in FIG. 2, the support frame 5 comprises an upper extendible member 17 and a lower extendible member 19. The upper extendible member 17 has a first longitudinal central axis Y1 and the lower extendible member 19 has a second longitudinal central axis Y2. The first and second longitudinal central axes Y1, Y2 are arranged substantially parallel to each other and, when the apparatus 1 is installed in the vehicle 3, extend transversely across the vehicle 3 substantially parallel to the transverse axis Y thereof.

The width of the support frame 5 can be adjusted by varying the lateral extent of the upper and extendible members 17, 19. The upper extendible member 17 comprises left and right outer sections 17L, 17R which both receive a portion of an upper centre piece 17C in a telescopic arrangement. Similarly, the lower extendible member 19 comprises left and right outer sections 19L, 19R which both receive a portion of a lower centre piece 19C in a telescopic arrangement. The upper and lower centre pieces 17C, 19C each comprise stop members (not shown) to limit the relative travel of the respective outer sections 17L, 17R, 19L, 19R. The width of the support frame 5 can be reduced for storage and increased to the required length when the apparatus 1 is to be installed. It will be appreciated that other arrangements can be implemented to adjust the length of the upper and lower extendible members 17, 19.

Figure 3:
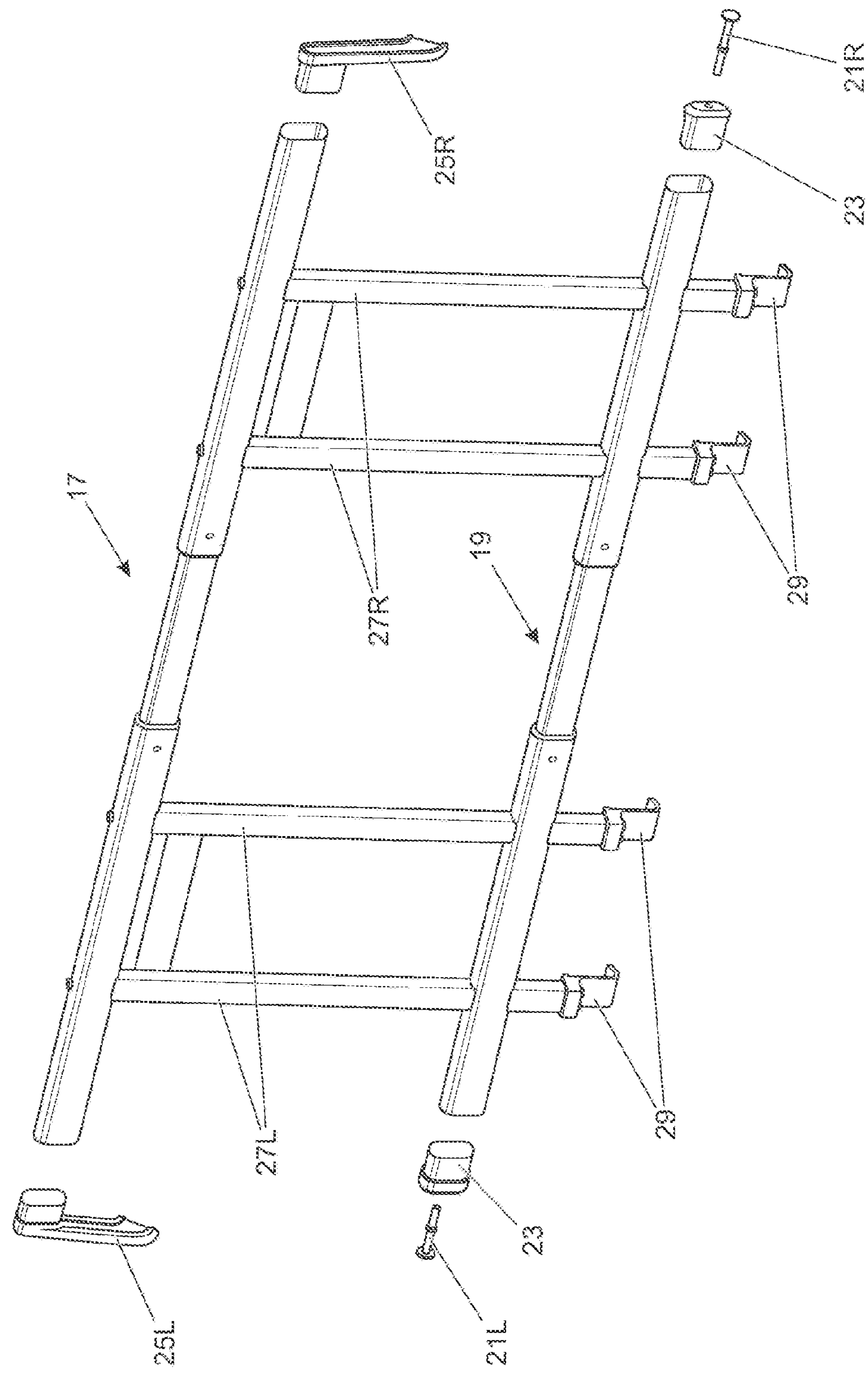
FIG. 3 shows an exploded view of the support frame shown in FIG. 2.

As shown in FIGS. 2 and 3, the support frame 5 comprises mounting means in the form of left and right frame striker pins 21L, 21R disposed at respective ends of the lower extendible member 19. The frame striker pins 21L, 21R are arranged co-axially with the second longitudinal central axis Y2. An end piece 23 is mounted in each end of the lower extendible member 19 to support the left and right frame striker pins 21L, 21R.

The upper extendible member 17 comprises locating means in the form of left and right locating arms 25L, 25R disposed at respective ends of the upper extendible member 17. The locating arms 25L, 25R are configured to locate in drainage channels provided on each side of the tailgate aperture A in which the apparatus 1 is installed. In use, the locating arms 25L, 25R space the upper extendible member 17 apart from the vehicle 3 to prevent damage to a rubber seal (not shown) or the like provided around the door aperture. The locating arms 25L, 25R also determine the angular orientation of the back element 11 of the seats 7. The angular position and/or length of the locating arms 25L, 25R could be adjustable to allow the orientation of the back element 11 to be adjusted. A resilient facing material, for example made of leather or an elastomeric material, can be provided on each of the locating arms 25L, 25R to prevent damage to the vehicle 3.

A first pair of upright frame members 27L is provided on the left hand side of the support frame 5; and a second pair of upright frame members 27R is provided on the right hand side of the support frame 5. The first and second pairs of upright frame members 27L, 27R are associated with the left and right seats 7L, 7R and provide support for the corresponding back elements 11L, 11R. The upright frame members 27L, 27R each have a fixed length (i.e. they are not extendible) in the present embodiment. A locating foot 29 is mounted at a lower end of each upright frame member 27L, 27R for engaging a floor of the vehicle 3. Each locating foot 29 has a curved profile to facilitate pivoting of the support frame 5 into position.

Figure 4:
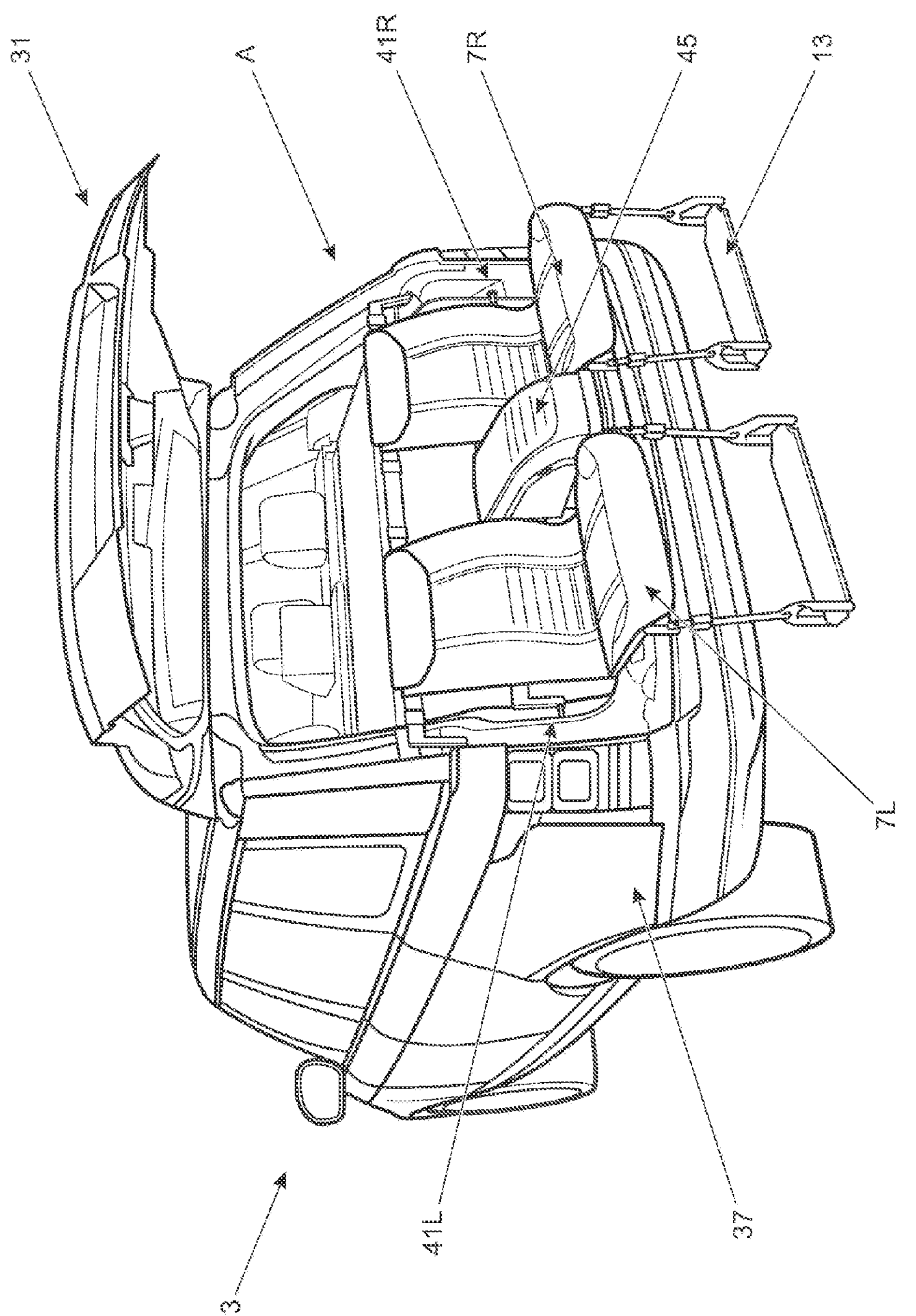
FIGS. 4 and 5 show the tailgate seating apparatus in accordance with an embodiment of the present invention disposed in a vehicle.
Figure 5:
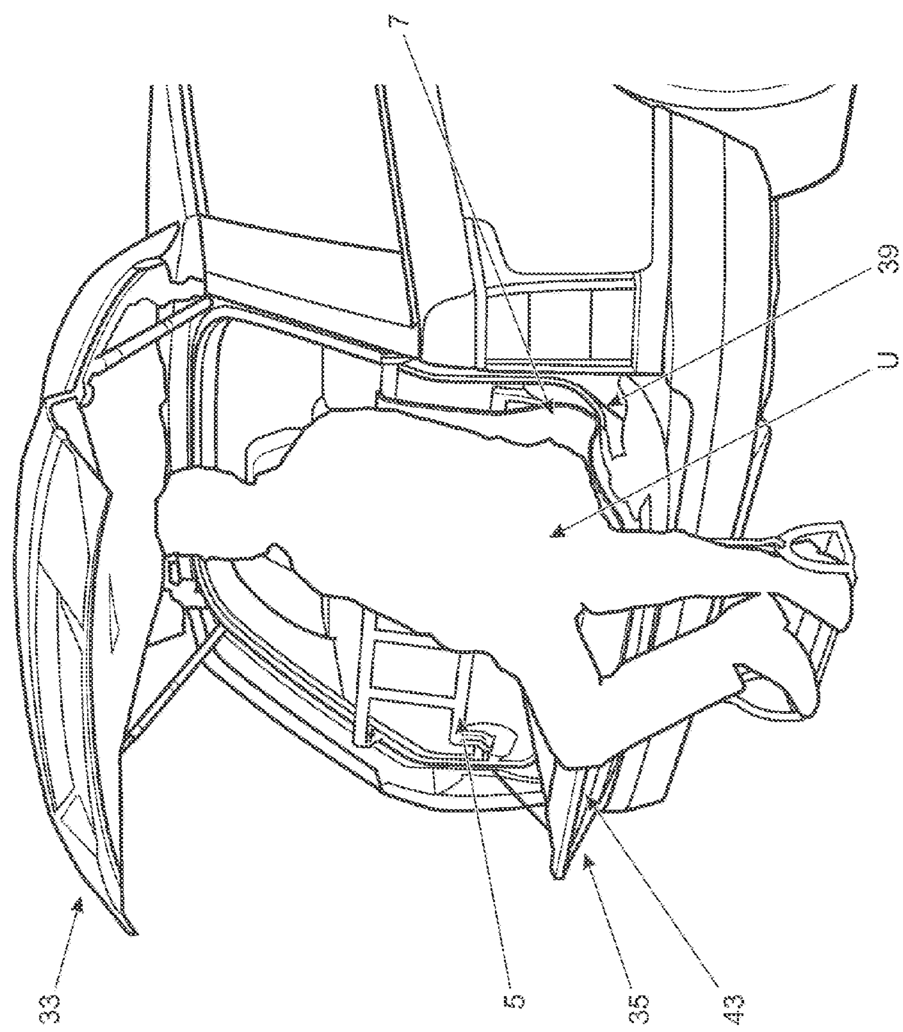

The apparatus 1 is configured to locate within a tailgate aperture A of the vehicle 3, as shown in FIGS. 4 and 5. The tailgate aperture A is provided at the rear of the vehicle 3 and provides access to a load space in the vehicle 3. A door closure element in the form of a tailgate 31 is provided to close the tailgate aperture A. In the present embodiment, the vehicle 3 has a split tailgate 31 comprising an upper tailgate 33 and a lower tailgate 35. The upper tailgate 33 is mounted to a vehicle body structure 37 by hinges (not shown) disposed along its upper edge so as to pivot upwardly to an open position. The lower tailgate 35 is mounted to the vehicle body structure 37 by hinges (not shown) disposed along its lower edge so as to pivot downwardly to an open position. When it is open, the lower tailgate 35 provides a substantially horizontally platform. A support cable 39 extends from the vehicle body structure 37 to the distal end of the lower tailgate 35. The support cables 39 provide additional support for the lower tailgate 35 when it is open.

The vehicle body structure 37 comprises fixing means in the form of left and right latching mechanisms 41L, 41R. The latching mechanisms 41L, 41R are fixedly mounted to the vehicle body structure 37 and arranged releasably to engage tailgate striker pins not shown) to secure the lower tailgate 35 in its closed (i.e. upright) position in a conventional manner. The left and right frame striker pins 21L, 21R disposed on the support frame 5 are arranged also to cooperate with the latching mechanisms 41L, 41R. Thus, the support frame 5 can be mounted in the tailgate aperture A by employing the existing latching mechanisms 41L, 41R used to secure the lower tailgate 35 in its closed position. The latching mechanisms 41L, 41R are electromechanically operated and can be released remotely, for example using a key fob (not shown) associated with the vehicle 3 or by operating a release button 43 provided on the lower tailgate 35. It will be appreciated that a separate set of latching mechanisms could be provided on the vehicle 3 for mounting the support frame 5.

Figure 6A:
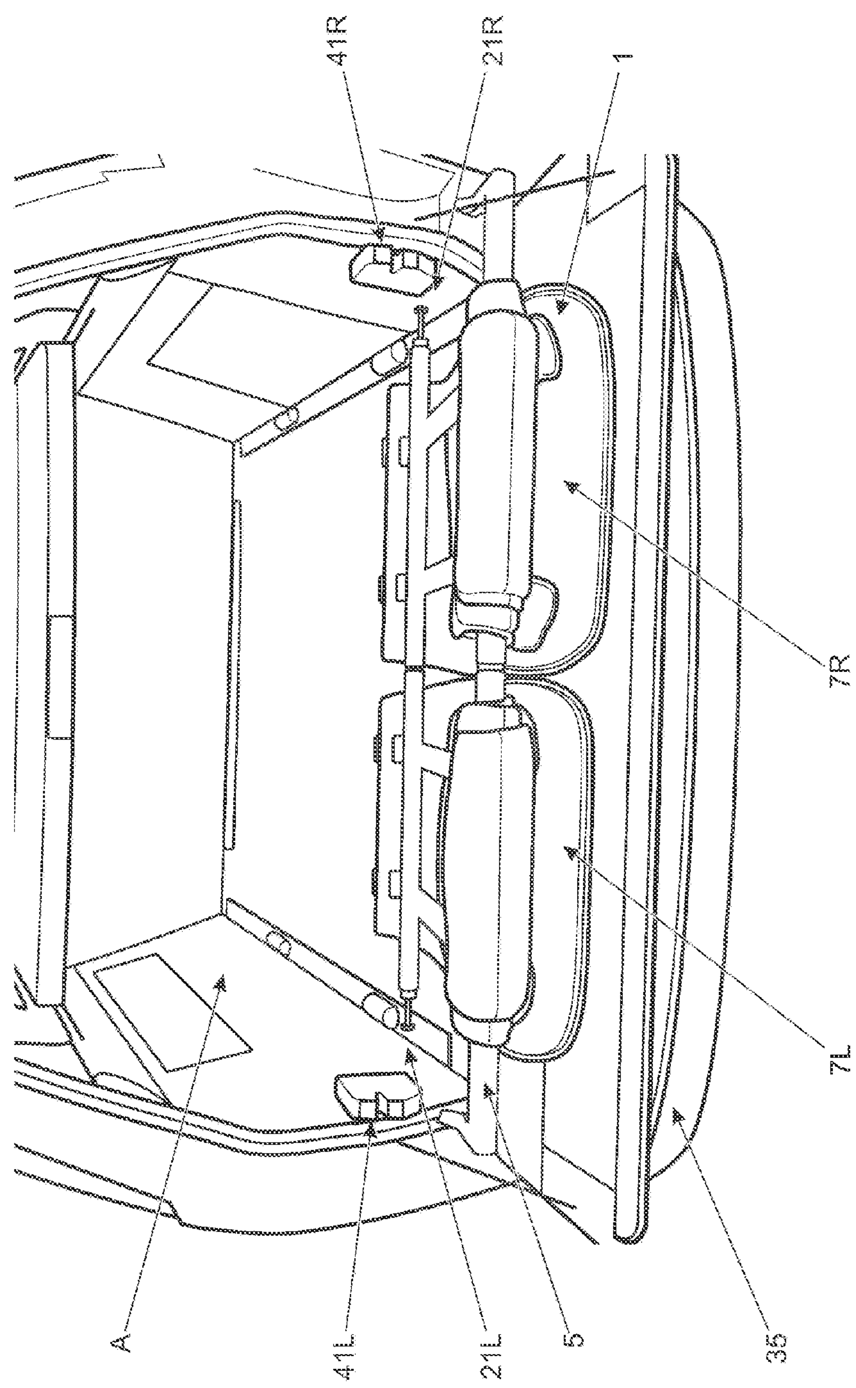
FIGS. 6A-C illustrate the sequence for mounting the tailgate seating apparatus to the vehicle in accordance with an embodiment of the present invention.
Figure 6B:
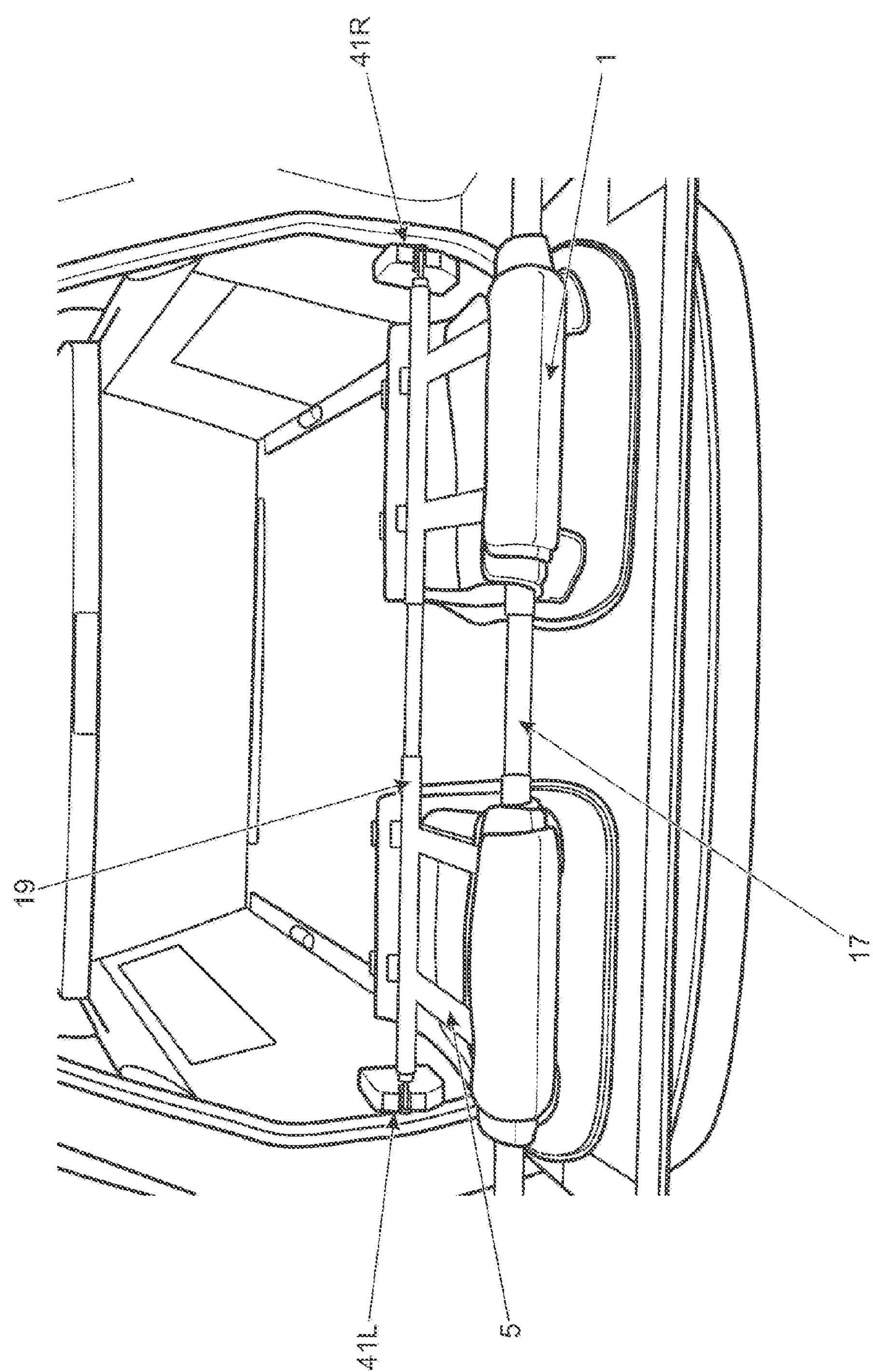
Figure 6C:
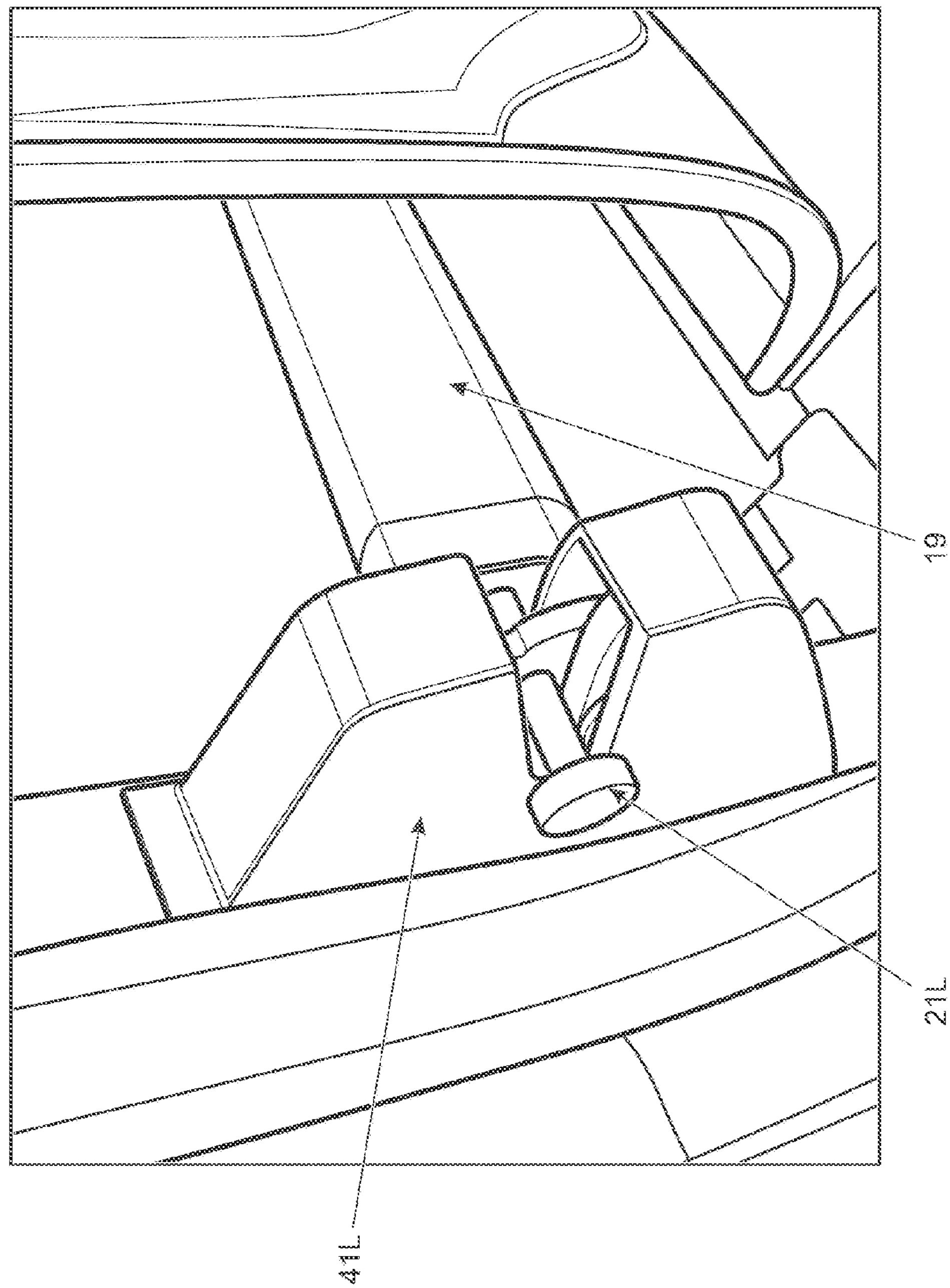

The mounting of the apparatus 1 to the vehicle 3 will now be described with reference to FIGS. 6A-C. The lower tailgate 35 is lowered to its open position and the upper tailgate 33 is raised to its open position, thereby opening the tailgate aperture A. The apparatus 1 is initially in a folded configuration for storage in which the base elements 9 are arranged in face-to-face contact with the back elements 11, as shown in FIG. 6A. The apparatus 1 is positioned on the lower tailgate 35 in its folded configuration such that the hooks 16 are located at (or extend over) the distal edge of the lower tailgate 35 (i.e. the rearmost edge of the lower tailgate 35).

The support frame 5 and the back assemblies 11 are then pivoted upwardly about the locating feet 29 disposed at the base of the upright frame members 27L, 27R. The left and right frame striker pins 21L, 21R provided on the support frame 5 are displaced into the respective left and right latch mechanisms 41L, 41R, as shown in FIG. 6B. The latch mechanisms 41L, 41R mechanically engage the corresponding frame striker pins 21L, 21R and retain the support frame 5 in position, as shown in FIG. 6C. The latch mechanisms 41L, 41R thereby positively locate the support frame 5 and inhibit movement relative to the vehicle 3. The use of frame striker pins 21L, 21R on the support frame 5 (rather than U-shaped hoops or bolts) permits a limited amount of rotational movement of the frame once the frame striker pins 21L, 21R are located in the latch mechanisms 41L, 41R. This rotational movement enables the support frame 5 to be pivoted such that the locating arms 25L, 25R locate in the respective drainage channels formed on each side of the tailgate aperture A.

The locating arms 25L, 25R abut the vehicle body structure 37 to prevent forward movement of the upper extendible member 17 (thereby inhibiting rotation of the support frame 5). Similarly, the locating feet 29 engage the floor of the load bay to limit movement of the lower extendible member 19 and to limit longitudinal movement of the base 9 of each seat 7L, 7R. The foot support 13 is then attached to the base element 9 by locating the adjustable straps 15 on the corresponding hooks 16.

Optionally, an electronic control unit (not shown) provided in the vehicle 3 could be manually or automatically configuring to identify that the apparatus 1 is mounted to the vehicle 3. The electronic control unit could be configured to inhibit one or more vehicle functions when the apparatus 1 is installed.

As illustrated in FIG. 5, when the apparatus 1 is mounted to the vehicle 3, a user U can sit in the seat 7. The apparatus 1 is intended to provide a social seat for use when the vehicle 3 is stationary. The weight of the user is at least partially supported by the lower tailgate 35 and the support cables 39. A centre console 45 can optionally be provided between the left and right seats 7L, 7R, as shown in FIG. 4. The centre console 45 can be mounted directly to the support frame 5 and can provide one or more storage compartments. Furthermore, the apparatus 1 can have only one seat, as shown in FIG. 5.

In order to remove the apparatus 1, the release button 43 is depressed to release the left and right latching mechanisms 41L, 41R. The frame striker pins 21L, 21R can thereby be removed from the latching mechanisms 41L, 41R and the support frame 5 pivoted into its folded position for storage.

Figure 7:
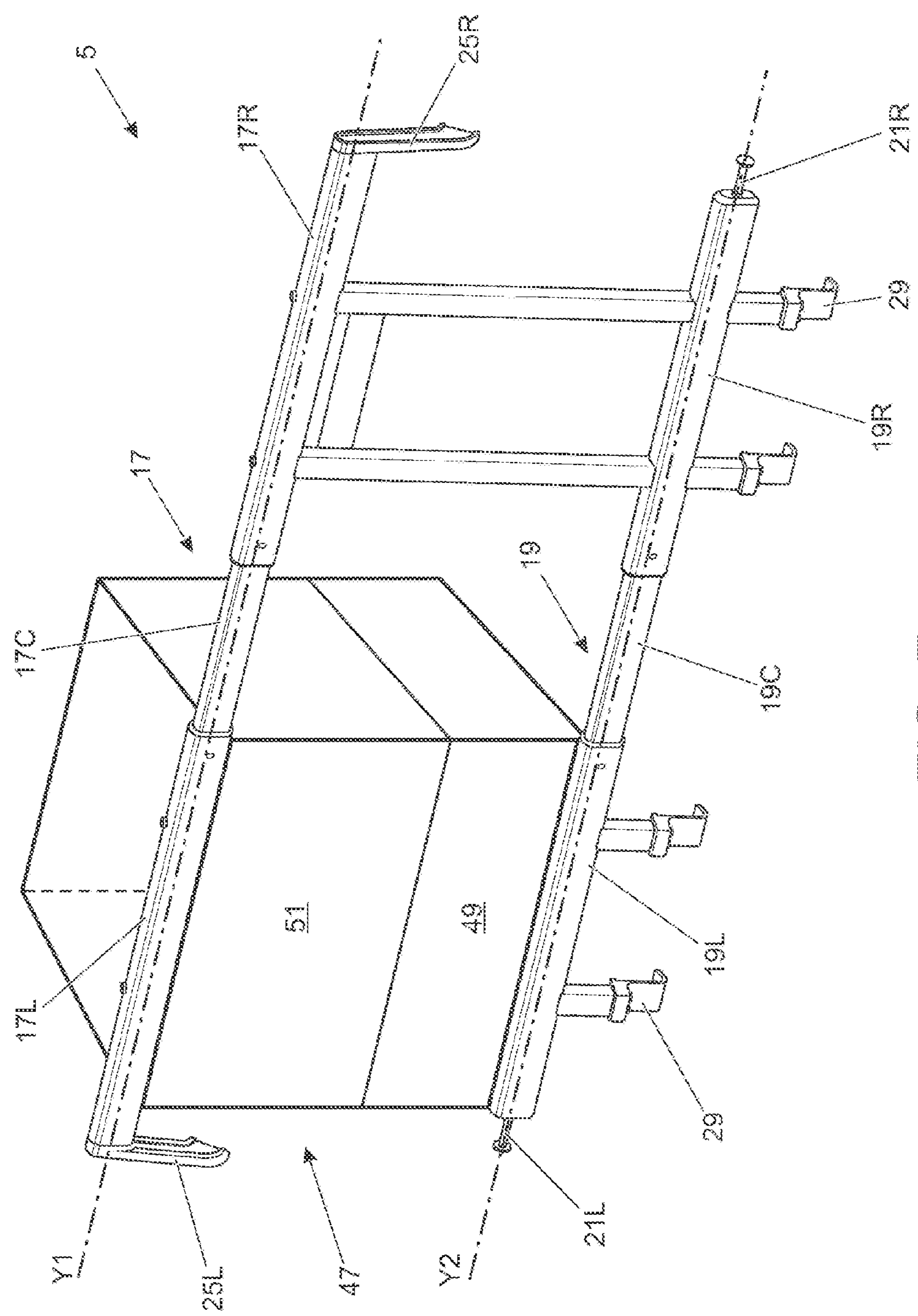
FIG. 7 illustrates an alternate arrangement in which a storage unit is mounted to the support frame in accordance with a further aspect of the present invention.

It will be appreciated that various changes and modifications can be made to the apparatus 1 described herein without departing from the scope of the present application. For example, it will be appreciated that the apparatus described herein can be used for functions other than providing a social or temporary seat 7. A further aspect of the present invention is illustrated in FIG. 7. In this embodiment, a storage unit 47 is mounted to the support frame 5. The storage unit 47 comprises one or more drawers 49 and a cupboard 51. The storage unit is shown positioned on the frame such that it would be located inside a vehicle, but alternatively, the storage unit could be positioned such that it protrudes from the other side of the frame, relative to the load space, such that it is protrudes towards the outside of the vehicle. The storage unit 47 can be used for storing sporting equipment, such as firearms, fishing rods, golf clubs or polo equipment. Alternatively or in addition, the storage unit 47 could provide a cooler unit for storing beverages, such as champagne.

In a further alternative, the support frame 5 could provide a removable support for mounting filming or photographic equipment to the vehicle 3.

The invention claimed is:

1. An apparatus for mounting in a door aperture of a vehicle, the apparatus comprising:

a mounting apparatus for removably mounting the apparatus in the door aperture, wherein said mounting apparatus is adapted to cooperate with a fixing device disposed on said vehicle; and a support frame comprising a first transverse member for positioning transversely across the door aperture, the mounting apparatus being provided on said first transverse member.

2. An apparatus as claimed in claim 1, wherein said mounting apparatus comprises a first connector and a second connector.

3. An apparatus as claimed in claim 2, wherein said first and second connectors each comprise a striker element.

4. An apparatus as claimed in claim 1, wherein said mounting apparatus is adapted to cooperate with a fixing device in the form of at least one latch fixedly mounted to said vehicle.

5. An apparatus as claimed in claim 4, wherein said at least one latch is configured to secure a door closure element associated with said door aperture.

6. An apparatus as claimed in claim 5, wherein the door closure element is a tailgate or a split tailgate element and said at least one latch is configured to secure said tailgate or said split tailgate element in a closed position.

7. An apparatus as claimed in claim 1, wherein said support frame comprises a second transverse member for positioning transversely across the door aperture, the second transverse member comprising at least one locating member for positioning against the vehicle.

8. An apparatus as claimed in claim 7, wherein said second transverse member comprises two locating members disposed at respective ends thereof for positioning against the vehicle at respective locations on opposite sides of the door aperture.

9. An apparatus as claimed in claim 7, wherein said at least one locating member is suitable for locating within a drainage channel formed adjacent to said door aperture.

10. An apparatus as claimed in claim 1, wherein said support frame comprises one or more locating feet for engaging a body structure of the vehicle.

11. An apparatus as claimed in claim 1, wherein the support frame has an adjustable width.

12. An apparatus as claimed in claim 1 comprising one or more seats, each seat comprising a base and a back support.

13. An apparatus as claimed in claim 12, wherein the base is configured to be supported by the vehicle; and the back support is configured to be supported by said support frame.

14. An apparatus as claimed in claim 13, wherein the base of each seat is coupled to the support frame to inhibit relative movement.

15. An apparatus as claimed in claim 12, wherein each seat comprises a reinforcing member disposed at a front edge of the base.

16. An apparatus as claimed in claim 12, comprising an occupant foot support associated with each said seat.

17. An apparatus as claimed in claim 1, comprising a carrier rack.

18. A vehicle in combination with the apparatus as claimed in claim 1.

19. An apparatus for mounting in a door aperture of a vehicle, the apparatus comprising:

mounting means for removably mounting the apparatus in the door aperture, wherein said mounting means is adapted to cooperate with fixing means disposed on said vehicle; and a support frame having a first transverse member for positioning transversely across the door aperture, the mounting means being provided on said first transverse member, and wherein said support frame comprises a second transverse member for positioning transversely across the door aperture, the second transverse member comprising locating means for positioning against the vehicle.

* * * * *